(12) United States Patent
Kusnezoff et al.

(10) Patent No.: US 8,366,972 B2
(45) Date of Patent: Feb. 5, 2013

(54) MATERIAL FOR PROTECTIVE COATINGS ON HIGH TEMPERATURE-RESISTANT CHROMIUM OXIDE-FORMING SUBSTRATES, METHOD FOR THE PRODUCTION THEREOF, AND USE THEREOF

(75) Inventors: Mihails Kusnezoff, Dresden (DE); Viktar Sauchuk, Dresden (DE); Nikolai Trofimenko, Dresden (DE)

(73) Assignee: Fraunhofer-Gesellschaft zur Forderung der Angewandten Forschung E.V., Munich (DE)

( * ) Notice: Subject to any disclaimer, the term of this patent is extended or adjusted under 35 U.S.C. 154(b) by 557 days.

(21) Appl. No.: 12/595,257

(22) PCT Filed: Apr. 11, 2008

(86) PCT No.: PCT/DE2008/000685
§ 371 (c)(1),
(2), (4) Date: Dec. 3, 2009

(87) PCT Pub. No.: WO2008/125103
PCT Pub. Date: Oct. 23, 2008

(65) Prior Publication Data
US 2010/0108953 A1    May 6, 2010

(30) Foreign Application Priority Data
Apr. 13, 2007  (DE) .......................... 10 2007 018 261

(51) Int. Cl.
*H01B 1/02*    (2006.01)
*H01B 1/08*    (2006.01)
*C04B 35/00*   (2006.01)
*C04B 35/04*   (2006.01)

(52) U.S. Cl. ...................... 252/518.1; 501/112; 501/120

(58) Field of Classification Search ............... 252/518.1; 501/112, 120
See application file for complete search history.

(56) References Cited

U.S. PATENT DOCUMENTS

| 3,055,833 | A  | 10/1957 | Baltzer |
| 5,942,349 | A  | 8/1999  | Badwal et al. |
| 7,407,717 | B2 | 8/2008  | Tietz et al. |

FOREIGN PATENT DOCUMENTS

| DE | 1050010 | 2/1959 |
| DE | 10050010 | 2/1959 |
| DE | 1109077 | 6/1961 |
| DE | 266670 A1 | 4/1989 |
| DE | 10306925 | 2/2004 |
| DE | 10306649 | 9/2004 |
| WO | WO 2006/059942 | 6/2006 |

OTHER PUBLICATIONS

International Search Report/Written Opinion for PCT/DE2008/000685, completed Mar. 9, 2009.
Ashcroft, G., et al. "Study of the Preparation Conditions for $NiMn_2O_4$ Grown From Hydroxide Precursors", Nov. 26, 2004, *Journal of the European Ceramic Society*; No. 26, pp. 901-908.
Azimi, S., et al., "Microstructure of Nickel-Manganese Oxide Thermistors", 1987, *High Tech Ceramics*, pp. 1893-1898.
Bodak, O., et al., "Microstructure, Crystal Structure and Electrical Properties of $Cu_{0.1}Ni_{0.8}Co_{0.2}Mn_{1.9}O_4$ Ceramics Obtained at Different Sintering Conditions," *Journal of Alloys and Compounds*, 2002, No. 347, pp. 14-23.
Caffin, J. P., et al., "Chemical Preparation of N. T. C. Thermistors With Low Resistivity and High Stability", 1987, High Tech Ceramics, pp. 1743-1751.
Drouet, Christophe, et al., "Synthesis and Characterization of Non-Stoichiometric Nickel-Copper Manganites", Mar. 31, 1999, *Solid State Ionics*, No. 123, pp. 25-37.
Gao, Jun-Feng, et al., "Preparation and Electrical Properties of Copper-Nickel Manganite Ceramic Derived from Mixed Oxalate", 2007, Sensors and Actuators A, vol. 135, pp. 472-475.
Ling, Hang, et al., "Electrical and Thermal Properties of Spinels", 2005, *Electrochemical Society Proceedings*, vol. 2005-07, pp. 1866-1873.
Schmidt, R., et al., Structural Properties of rf Magnetron Sputter Deposited Nickel Manganate Thin Films:, Aug. 3, 2005, *Surface Science*, vol. 595, pp. 239-248.
Smit, J., et al., Ferrite, 1962, *Philips Technische Bibliothek*, Eindhoven. pp. 38-41.
Vandenberghe, R. E., et al., "On the Stability of the Cubic Spinel Structure in the System Cu-Mn-O", 1973, *Mat. Res. Bull.: Pergamon Press, Inc.*, vol. 8, pp. 571-579.
Yang, Zhenguo, et al., "Investigation of Modified Ni-Cr-Mn Base Alloys for SOFC Interconnect Applications", 2006, *Journal of The Electrochemical Society*, vol. 153, No. 10, pp. A1873-A1879.
Yang, Zhenguo, et al., "$(Mn,Co)_3O_4$ Spinel Coatings on Ferritic Stainless Steels for SOFC Interconnect Applications", 2007, *International Journal of Hydrogen Energy*, vol. 32, pp. 3648-3654.

*Primary Examiner* — Bijan Ahvazi
(74) *Attorney, Agent, or Firm* — Barnes & Thornburg LLP

(57) ABSTRACT

The invention relates to a material for the formation of protective layers resistant to high temperatures on chromium oxide forming substrates, to a manufacturing method and to a use of these materials. It is suitable for a use as a chromium evaporation layer for metallic alloys containing chromium in the high temperature range. It is the object of the invention to provide a material for applications as a protective layer for chromium oxide forming alloys of high temperature resistance which is thermally and mechanically permanently stable and ensures a high electrical conductivity at the operating temperature of the fuel cell. In accordance with the invention, the material is formed from a spinel phase and an oxidic secondary phase which is preferably formed with an oxidic compound containing manganese.

4 Claims, 4 Drawing Sheets

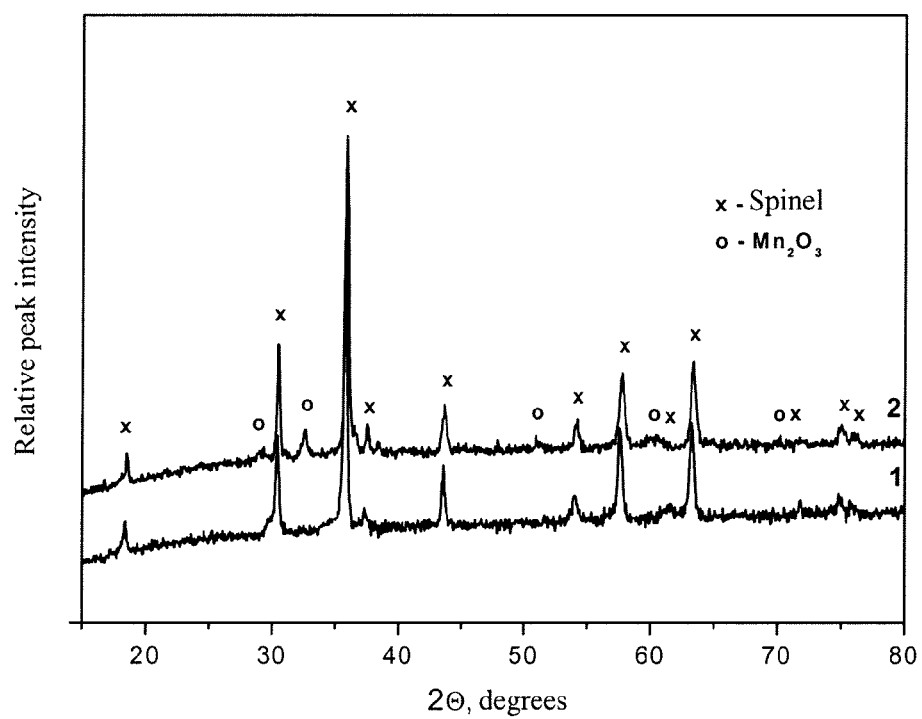
Fig.1. X-ray diffractograms of materials synthesized in accordance with the invention: 1 - in accordance with embodiment 1; 2 - in accordance with embodiment 2.

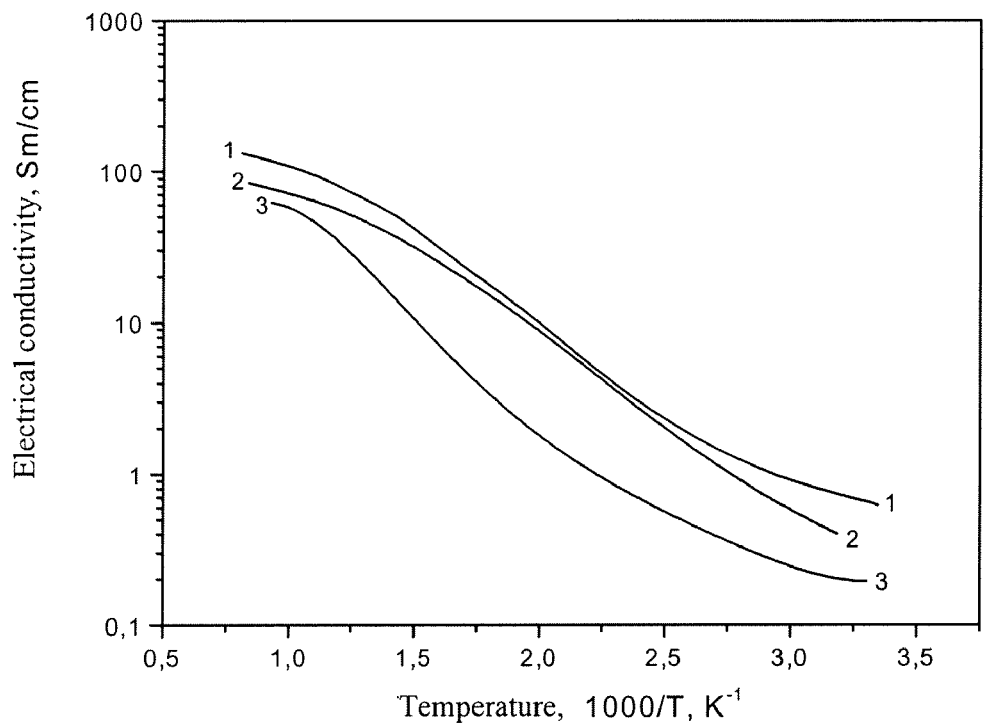
Fig.2. Electrical conductivity of compounds of different stoichiometry: 1 - $(CuO)_{0.6}(NiO)_{0.4}Mn_2O_3$, 2 - $(CuO)_{0.8}(NiO)_{0.2}Mn_2O_3$, 3 - $(CuO)_{0.9}(NiO)_{0.1}Mn_2O_3$.

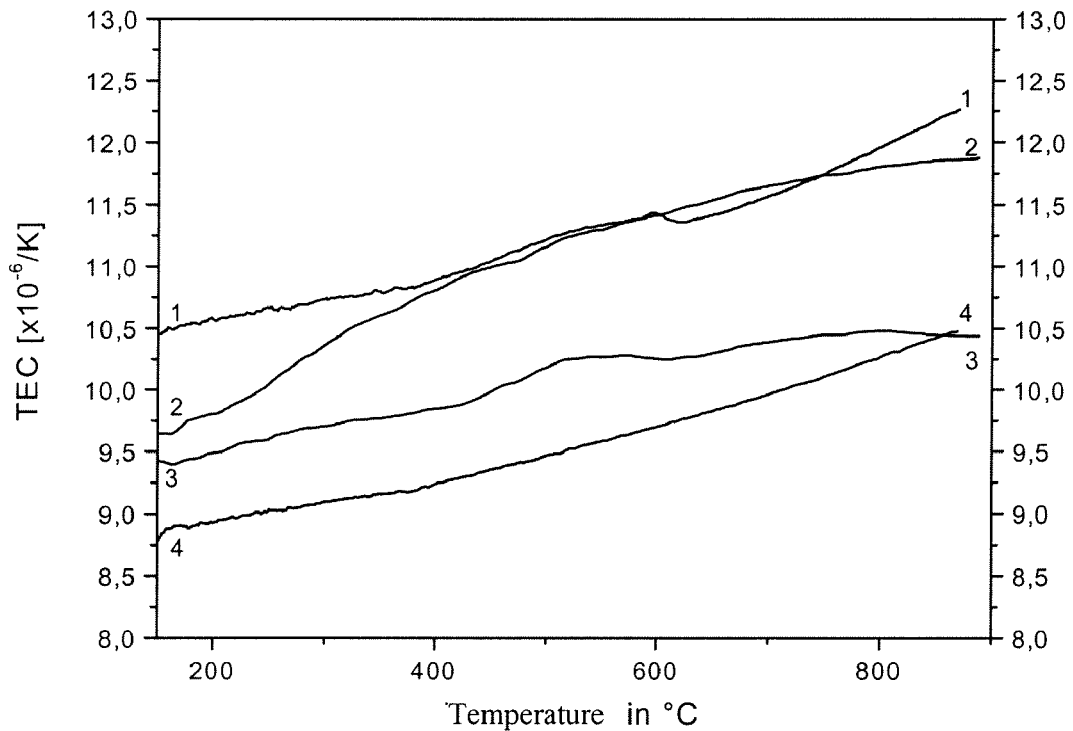
Fig. 3. Relationship of temperature and coefficient of thermal expansion of the materials with respect to interconnector materials: 1 - Crofer22APU, 2 - $(CuO)_{0.6}(NiO)_{0.4}Mn_2O_3$, 3 - $(CuO)_{0.8}(NiO)_{0.2}Mn_2O_3$, 4 - Ducrolloy.

Figure 4a) Cross-section polish,
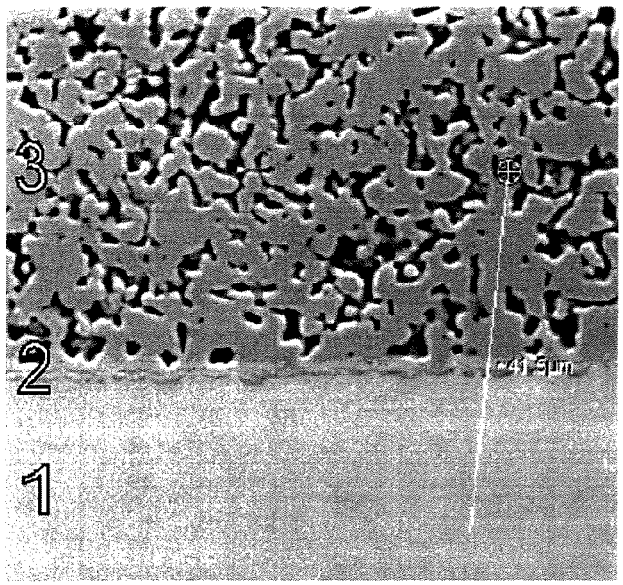
b) Element distribution
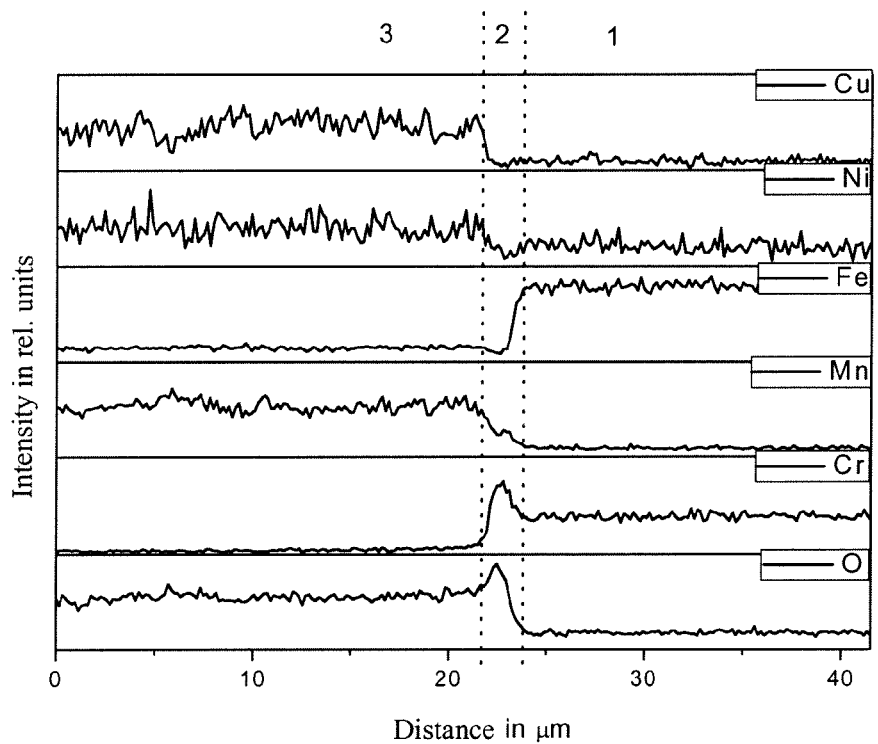
Fig.4. FESEM images of the cross-section polish (a) and element distribution along the scan line (b) in the layer system $(CuO)_{0.6}(NiO)_{0.4}Mn_2O_3$/Crofer22APU after the heat treament at 850°C in air: 1 - Crofer22APU, 2 - Cr/Mn oxide layer, 3 - $(CuO)_{0.6}(NiO)_{0.4}Mn_2O_3$ protective layer.

MATERIAL FOR PROTECTIVE COATINGS ON HIGH TEMPERATURE-RESISTANT CHROMIUM OXIDE-FORMING SUBSTRATES, METHOD FOR THE PRODUCTION THEREOF, AND USE THEREOF

CROSS-REFERENCE TO RELATED APPLICATIONS

This application is the U.S. national phase of PCT/DE2008/000685 filed Apr. 11, 2008. PCT/DE2008/000685 claims Convention priority to DE 10 2007 018 261.0 filed Apr. 13, 2007. The disclosures of both DE 10 2007 018 261.0 and PCT/DE2008/000685 are hereby incorporated herein by reference.

The invention relates to a material for the formation of protective layers resistant to high temperatures on chromium oxide forming substrates, to a manufacturing method and to a use of these materials. It is suitable for a use as a chromium evaporation layer for metallic alloys containing chromium in high temperature operation.

The material in accordance with the invention is in particular advantageously suitable for use in high temperature fuel cells. As already expressed, the material should be able to be used at high temperatures which can lie in the range between 550 and 1000° C.

A direct conversion of chemical energy into electric energy is possible using high temperature fuel cells.

In this respect, the cathode/electrolyte/anode unit is a central functional element of fuel cells and comprises two electrodes—cathode and anode—which are separated from one another by an oxygen conducting electrolyte.

To achieve an electrical voltage level acceptable for technical applications, individual cells have to be connected together in series. In the planar concept, the so-called interconnectors or bipolar plates have to be installed between these individual cells with which the gas infeed to the electrodes and the contacting of the individual cells between one another takes place.

At the high temperatures, the bipolar plate has to be as electrically conductive and oxidation resistant as possible. In addition, the coefficient of thermal expansion of the metallic interconnector should be relatively low to ensure a good thermomechanical compatibility with the other components of the fuel cell.

Only a very few materials can be considered for the manufacture of interconnectors due to a plurality of constraints. The interconnector materials are therefore primarily considered, in particular for uses in planar high temperature fuel cells, which have a high chromium content; they are e.g. alloys on a chromium basis or ferrite steels (alloys on an iron basis containing chromium).

However, the problem results with these materials that a chromium(III) oxide layer ($Cr_2O_3$) forms on the surface of the interconnector at the increased operating temperature under an oxidizing atmosphere present there.

The chromium oxide reacts at high temperatures with oxygen and water vapor while forming chromium trioxide $CrO_3$ and chromium oxide hydroxides $CrO_2(OH)_2/CrO(OH)_4$. These newly formed compounds containing chromium have a high vapor pressure at the operating temperature of the fuel cell and can thus easily move into the cathode. These Cr species react with the cathode material there, which results in a change in its composition and, in the long term, causes the degradation of the catalytic activity of the cathode. This makes a considerable contribution to the performance loss of the fuel cell.

Different materials and methods are known from the prior art for the prevention or minimization of the chromium evaporation. Technologies achieve the best results in this respect in which the surface of the interconnectors is covered with so-called protective layers.

The interconnectors are, for example, coated with materials containing lanthanum such as $LaCrO_3$. The compound containing lanthanum such as $LaCrO_3$ is either applied directly as a protective layer onto the metal surface or the compounds such as $La_2O_3$, $LaB_6$ are applied as reactive layers so that they react with the chromium oxide to $LaCrO_3$ during operation. This method has the disadvantage that microcracks can form in the $LaCrO_3$ layer and can thus not ensure any sufficient protection against the chromium evaporation.

A further variant is the coating of interconnectors with chromium-free perovskite layers which are similar to the cathode material. The layers serve both for protection and for cathode contacting. However, they have the disadvantage that a new chemical compound on a chromium base is formed at the border between the layer and the interconnector and can grow there, said layer causing high degradation of the contact resistance and consequently also of the fuel cell Spinel compounds per se are also suitable as effective materials for protective layers. The generation of Spinel protective layers takes place either by the use of steels such as microalloy elements such as manganese, nickel or cobalt which can form spinel layers from the basic material together with chromium under an oxidizing atmosphere. Spinel compounds can also be formed by the application of layers which contain manganese and which result in spinel compounds under reaction with chromium oxide. The formation of these chromium spinel structures demonstrably results in a reduction in the chromium evaporation. This is, however, still not yet sufficient to ensure a long service life of the fuel cell without degradation since chromium diffusion through the spinel layer containing chromium still occurs. In addition, the Cr(VI) oxide and chromium hydroxide species can continue to be released due to their high Cr portion in the spinel phase.

The chromium-free spinel compounds are nevertheless used as protective layer materials. It is thus known from DE 103 06 647, for example, that a gastight, chromium-free spinel layer of the composition $Co_{3-x-y}Cu_xMn_yO_4$ where $0<x<1.5$, $0<y<3$ and $(x+y)<3$ is formed on the surface of the substrate by application of oxides, which contain Co, Cu and/or Mn in them, onto a chromium oxide forming substrate and heating to 1000° C.

It is thus, for example, also known that a spinel layer, comprising, on the one hand, an element from the group (manganese, magnesium, vanadium) and a further element from the group (cobalt, nickel, iron, copper or vanadium) advantageously forms such a gastight layer which, formed on a chromium oxide forming substrate, should prevent an evaporation of chromium from the substrate even at temperatures up to 1000° C.

It is known from DE 10 2005 015 755 A1 that the coating of a chromium oxide forming alloy on a Cr or FeCr base which contains further metallic alloys such as manganese or magnesium in a concentration less than 5% by weight with at least two metals from the group cobalt, copper, iron, nickel, zinc, titanium, tin or vanadium at temperatures between 600° C. and 1000° C. and under oxidizing operating conditions results in the formation of a thin, chromium-free, gastight oxidic spinel layer with good electrical conduction. $Co_x$-

$Cu_yMn_{3-x-y}O_4$, $Ni_xCu_yMn_{3-x-y}O_4$, $Co_xFe_yMn_{3-x-y}O_4$, $Fe_xCu_yMn_{3-x-y}O_4$ where $0 \leq x \leq 2$, $0 \leq y \leq 1$ and $(x+y)<3$ are named as possible spinel layers.

The reactions for the formation of the protective layer on the basis of one or more components of the substrate material have the disadvantage, however, that they change the composition of the substrate material.

It is moreover known (Journal of the Electrochemical Society 154-4 (2007), pages A295-A306) that manganese can also evaporate intensively from the anode side of the interconnector. This can result in the fast consumption of the spinel forming material in the interconnector material so that the protective layer arising on the surface is not sufficiently homogeneous and thick to prevent chromium evaporation reliably and sustainably.

A lack of one constituent component frequently triggers the formation of external phases in addition to the spinel compound. They also cause a reduction in the mechanical strength of the compound and thus non-repairable cracks in the layer, in particular on thermal loading. This results in an increase in the chromium evaporation and in fast degradation of the fuel cell in permanent operation.

It is moreover often difficult to match the coefficient of thermal expansion of a protective layer material and of the metal alloy precisely to one another. The cracks in the protective layer thereby arise in the thermocyclization of the fuel cell which degrade the tightness of the layer.

The approach of all inventions in this field comprises the realization of a protective layer which is as gastight as possible with a matched coefficient of thermal expansion and good electronic conductivity. The realization of gastight protective layers is, however, technically very demanding and high-cost as a rule.

It is therefore the object of the invention to provide a material for applications as a protective layer for chromium oxide forming alloys of high temperature resistance which is thermally and mechanically permanently stable and ensures a high electrical conductivity at the operating temperature of the fuel cell.

The coefficient of thermal expansion of this material should in this respect be settable in the ideal range required for the interconnector ($TEC_{RT\ldots 1000^\circ C.}$=9.8-12.4 ppm/K) by the slight variation of the composition with respect to the coefficient of thermal expansion. Furthermore, the material should be able to exert a Bettering action for chromium species in the gas phase so that a protective effect can also be ensured with a low porosity of the protective layer.

The object is achieved by the features of claim 1 with respect to the material. It can be manufactured using a method in accordance with claim 9 and a suitable use is set forth in claim 17.

Advantageous embodiments and further developments of the invention can be achieved using features designated in the subordinate claims.

It is therefore proposed in accordance with the invention to provide an oxide ceramic sintering material which is formed from a spinel phase and a secondary phase, wherein the spinel phase should preferably be formed by a nickel-copper-manganese/iron compound and the secondary phase by an oxidic compound, preferably by a manganese oxidic compound.

The phase used for the material in accordance with the invention on the basis of a nickel-copper-manganese/iron compound with a spinel structure reaches a sufficiently high electrical conductivity which is also maintained at the mentioned high temperatures (FIG. 2). Due to the high electrical conductivity, the material can simultaneously be used as a contact layer for the cathode surface of a cathode/electrode/anode unit of a high temperature fuel cell. It should thus achieve an electrical conductivity of at least 10 S/cm, preferably at least 80 S/cm at a temperature of 850° C., that is, in the operating temperature range of high temperature fuel cells.

This also applies to the coefficient of thermal expansion while taking account of the coefficient of thermal expansion of materials which are used for interconnectors (FIG. 3). This ensures a sufficiently high mechanical stability of the structures in connection with the interconnector materials at the prevailing thermal conditions.

The secondary phase on the basis of a manganese oxidic compound furthermore has the property of reacting with released oxide compounds containing chromium at the mentioned high temperatures and a present oxidizing operating atmosphere and it thus ensures the additional protection against volatile chromium species. Sublimation of the chromium to the cathode and thus a poisoning of the cathode or cathode/electrolyte interface by chromium can thereby be effectively prevented.

A further advantage of a secondary phase on the basis of a manganese oxidic compounds is the following: It can serve as a source of the required components (Mn) for the metal alloy. An Mn depletion can occur at the anode side of the interconnector due to the Mn evaporation. The Mn diffusion from the cathode side to the anode side can be considerably minimized at operating temperatures of this process.

The secondary phase should only be present in the material in accordance with the invention with a low portion. The reaction between secondary phase and oxide compounds containing chromium should not have any substantial effect on the electrical and mechanical properties of the material in permanent operation.

The material in accordance with the invention can be formed, for example, from or using copper(II) oxide (CuO), nickel(II) oxide (NiO) and manganese(III) oxide ($Mn_2O_3$)/iron(III) oxide ($Fe_2O_3$) by a solid body reaction in a heat treatment in an atmosphere containing air or in oxygen. They should be used as powder in this respect.

In this respect, CuO should be contained in the powder mixture with a portion of 0 to 100 mol. %, NiO with 0 to 100 mol. %, $Fe_2O_3$ with 0 to 100 mol. % and $Mn_2O_3$ with 0 to 100 mol. %. The portion of $Mn_2O_3$ should preferably be in the range of 1 to 100 mol. %

The application onto a substrate can, for example, also take place by means of thermal injection or by a coating process in vacuum. The last-named can, for example, takes place by means of a PVD or CVD technology known per se. A suitable target can be manufactured from the powder in this respect and thus be coated in this manner.

The corresponding portions of the oxides should be pretreated by the careful permanent stirring/homogenization e.g. in the planetary ball mill.

It must be observed in the manufacturing process in this respect whether additional media are present in the pretreatment. It has surprisingly been found that by a mixing of ethanol into the powders, a single-phase or two-phase material can be obtained in dependence on the ratio of CuO to NiO. The proportion of a second phase (secondary phase) can be increased by the additional use of alcohol/ethanol.

The solid body reaction was already able to be initiated at a temperature of 800° C. and a sintering of the powder components took place at temperatures from at least 1000° C. It is also important in the manufacturing process that defined calcination temperatures are observed since the material synthesized at lower temperatures (<1000° C.) and at higher temperatures (>1200° C.) is multiphase and is thereby thermally and chemically unstable. It has been shown that it is particularly favorable if the synthesis is carried out at 1100° C.±10° C.

The mol ratios in which the starting compounds are used are preferably 0.0 to 1.0 $(CuO)_x$ for the copper, 0.0 to 1.0 $(NiO)_y$ for nickel, 0.0 to 1.0 $(Mn_2O_3)$ for manganese and 0.0 to 1.0 for iron relative to the stoichiometric formula $(CuO)_x(NiO)_y(Mn_2O_3)_z(Fe_2O_3)_{1-z}$.

The invention will be explained in more detail in the following with reference to embodiments.

Embodiment 1

Manufacture of a compound having a portion of secondary phase below 2.0 mol. %:

2.0268 g CuO, 1.2688 g NiO and 6.7044 g Mn2O3, which corresponds to the component ratio $(CuO)_{0.6}(NiO)_{0.4}(Mn_2O_3)$, is weighed in and homogenized in the planetary ball mill over a period of 24 hours. The homogenous powder is screened and calcinated at a temperature of 1100° C. for 15 hours.

The material manufactured in this manner has a composition of the spinel phase of $Cu_{0.6}Ni_{0.4}Mn_2O_4$. The portion of the secondary phase $(MnO_x)_{1-y}+(CuO/NiO)_y$ (1<x<1.5 und 0<y<0.5) is below 2.0 mol. % in this respect.

Embodiment 2

Manufacture of a compound having a portion of secondary phase of 2.0 to 5.0 mol. %:

2.0268 g CuO, 1.2688 g NiO and 6.7044 g Mn2O3, which corresponds to the component ratio $(CuO)_{0.6}(NiO)_{0.4}(Mn_2O_3)$, is weighed in, 10 ml ethanol is added and homogenization is carried out in the planetary ball mill over a period of 24 hours. The homogenous powder is dried at a temperature of 70° C. and then screened. The screened powder is calcinated at a temperature of 1100° C. for 15 hours.

The material manufactured in this manner has a composition of the spinel phase of $Cu_{0.6}Ni_{0.4}Mn_2O_4$. The portion of the secondary phase $(MnO_x)_{1-y}+(CuO/NiO)_y$ (1<x<1.5 und 0<y<0.5) reaches 2.0 and 5.0 mol. % in this respect.

Embodiment 3

For the manufacture of a material having a portion of secondary phase below 2.0 mol. %, 2.6893 g CuO, 0.6313 g NiO, 6.3382 g Mn2O3 and 0.6748 g Fe2O3 was weighed in to obtain a ratio of the components of $(CuO)_{0.8}(NiO)_{0.2}(Mn_2O_3)_{0.95}(Fe_2O_3)_{0.1}$ The mixture had 10 ml ethanol added and was homogenized in a planetary ball mill over a time of 24 h. Drying subsequently took place at a temperature of 70° C. The then screened powder was subjected to a heat treatment at a temperature of 1100° C. over a period of 15 h. The material obtained in this way had a composition of the spinel phase of $Cu_{0.8}Ni_{0.2}Mn_{0.9}Fe_{0.3}O_4$. The portion of the secondary phase $(MnO_x)_{1-y}+(CuO/NiO)_y$ (1<x 1.5 and 0<y<0.5) was below 2.0 mol. % in this respect.

There are shown:

FIG. 1 X-ray diffractograms of a material synthesized in accordance with the invention;

FIG. 2 a diagram with the temperature-dependent electrical conductivity for different compounds;

FIG. 3 a diagram which reproduces the connection of temperature and coefficient of thermal expansion of materials with respect to alloy steel Crofer22APU and Ducrolloy;

FIG. 4a a layer design as a grinding pattern; and

FIG. 4b EDX spectra of layer systems on a substrate Crofer22APU after thermal treatment.

It becomes clear with the X-ray diffractograms shown in FIG. 1 that the phase composition of the material sintered at 1100° C. is dependent on the manufacturing process. Diagrams 1 and 2 correspond to the compound which is manufactured in accordance with embodiment 1 and 2 respectively with the stoichiometry $(CuO)_{0.6}(NiO)_{0.4}(Mn_2O_3)$.

The relationship of temperature and electrical conductivity is illustrated for compounds $(CuO)_x(NiO)_y(Mn_2O_3)$ with a different CuO/NiO ratio in the diagram in accordance with FIG. 2.

The thermal expansion of $(CuO)_x(NiO)_y(Mn_2O_3)$ with different ratios of CuO/NiO is set forth from the diagram shown in FIG. 3 with respect to special steels Crofer22APU and Ducrolloy alloy in the temperature range from 0 to 900° C. and it becomes clear that only slight differences in the coefficient of thermal expansion of these materials are present at the operating temperature so that they can be used with one another without problem in combination even with high temperature fuel cells.

FIG. 4 shows the typical design of the layer system which forms on the substrate covered with the protective layer after the thermal treatment at 850° C. in air for 100 h. The material in accordance with embodiment 1 was applied to the substrate Crofer22APU by roll coating. The associated EDX element profiles for O, Cr, Mn, Fe, Cu, Ni (FIG. 4b) clearly show the layer structure.

A thin chromium/manganese mixed oxide layer (region 2) has formed at the border between the substrates (region 1) and the protective layer. The outer layer (region 3), which comprises the material in accordance with the invention, does not contain any portions of chromium detectable by means of EDX.

The material in accordance with the invention for protective layers containing chromium can be used in high temperature fuel cells due to their chemical, thermal and electrical properties.

The invention claimed is:

1. A material for protective layers on chromium oxide forming substrates resistant to high temperatures, the material comprising a spinel phase having the composition $(Cu_xNi_{1-x})_y(Mn_{1-z}Fe_z)_2O_4$, where 0.0<x<1.0, 0.8≦y≦1.2 and 0.0<z<1, and an oxidic secondary phase having the composition $(MnO_x)_{1-y}+(CuO/NiO)_y$, where 1<x<1.5 and 0<y<0.5.

2. The material in accordance with claim 1 wherein the secondary phase is contained with a proportion of 0.1 to 20 vol. %.

3. The material in accordance with claim 1 wherein the secondary phase is distributed homogenously in the spinel phase.

4. The material in accordance with claim 1 having an electrical conductivity of at least 10 S/cm at a temperature of 850° C.

* * * * *